US011170319B2

(12) United States Patent
Biswas et al.

(10) Patent No.: US 11,170,319 B2
(45) Date of Patent: Nov. 9, 2021

(54) DYNAMICALLY INFERRED EXPERTISE

(71) Applicant: Cisco Technology, Inc., San Jose, CA (US)

(72) Inventors: Sujit Biswas, San Jose, CA (US); Milind Naphade, Cupertino, CA (US); Manjula Shivanna, San Jose, CA (US); Gyana Ranjan Dash, San Jose, CA (US); Srinivas Ruddaraju, Sunnyvale, CA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1022 days.

(21) Appl. No.: 15/581,719

(22) Filed: Apr. 28, 2017

(65) Prior Publication Data

US 2018/0314956 A1    Nov. 1, 2018

(51) Int. Cl.
*G06N 20/00* (2019.01)

(52) U.S. Cl.
CPC .................................... *G06N 20/00* (2019.01)

(58) Field of Classification Search
CPC ..................................................... G06N 20/00
See application file for complete search history.

(56) References Cited

U.S. PATENT DOCUMENTS

| | | | | |
|---|---|---|---|---|
| 7,539,697 B1 * | 5/2009 | Akella | ..................... | H04L 51/32 |
| 8,718,534 B2 * | 5/2014 | Srinivas | ..................... | G09B 7/00 |
| | | | | 434/350 |
| 9,465,889 B2 | 10/2016 | Wark | | |
| 9,959,579 B2 * | 5/2018 | Purohit | .................. | G06Q 50/01 |
| 2004/0267686 A1 * | 12/2004 | Chayes | ................. | G06F 16/355 |
| 2006/0042483 A1 * | 3/2006 | Work | ................ | G06F 16/24578 |
| | | | | 101/91 |
| 2007/0214133 A1 * | 9/2007 | Liberty | ............... | G06F 16/3338 |
| 2010/0174813 A1 * | 7/2010 | Hildreth | .................. | H04L 51/34 |
| | | | | 709/224 |
| 2011/0082825 A1 * | 4/2011 | Sathish | .................. | G06Q 30/08 |
| | | | | 706/46 |

(Continued)

OTHER PUBLICATIONS

Worsley et al. (What's an Expert? Using learning analytics to identify emergent markers of expertise through automated speech, sentiment and sketch analysis, Jan. 2011, pp. 1-5) (Year: 2011).*

(Continued)

*Primary Examiner* — George Giroux
(74) *Attorney, Agent, or Firm* — Behmke Innovation Group LLC; James M. Behmke; James J. Wong

(57) ABSTRACT

In one embodiment, a computing device scans a plurality of available data sources associated with a profiled identity for an individual, and categorizes instances of the data sources according to recognized terms within the data sources. Once determining whether the profiled identity contributed positively to each categorized instance, categorized instances that have a positive contribution by the profiled identity may be clustered into clusters. The computing device may then rank the clusters based on size of the clusters and frequency of recognized terms within the clusters, and can then infer an expertise of the profiled identity based on one or more best-ranked clusters. The inferred expertise of the profiled identity may then be stored.

17 Claims, 9 Drawing Sheets

(56) References Cited

U.S. PATENT DOCUMENTS

| | | | | |
|---|---|---|---|---|
| 2012/0254096 | A1* | 10/2012 | Flinn | G06N 5/048 706/52 |
| 2012/0254099 | A1* | 10/2012 | Flinn | G06F 40/20 706/52 |
| 2013/0113816 | A1* | 5/2013 | Sudarsky | G06T 11/206 345/589 |
| 2013/0179428 | A1 | 7/2013 | Archambault et al. | |
| 2014/0136256 | A1 | 5/2014 | Brown | |
| 2015/0019565 | A1* | 1/2015 | Lijachev | G06F 16/95 707/748 |
| 2016/0042071 | A1 | 2/2016 | Ghosh et al. | |
| 2016/0078348 | A1* | 3/2016 | Finch | G06N 5/04 706/12 |
| 2016/0140186 | A1 | 5/2016 | Langen | |
| 2016/0370274 | A1* | 12/2016 | Rowe | G01V 8/02 |
| 2017/0061550 | A1* | 3/2017 | Lin | G06Q 50/01 |
| 2017/0103073 | A1* | 4/2017 | Ben-Tzur | G06Q 30/0282 |

OTHER PUBLICATIONS

Pan et al. (Predicting missing links and identifying spurious links via likelihood analysis, Mar. 2016, pp. 1-10) (Year: 2016).*

Dom, et al., "Graph-based ranking algorithms for e-mail expertise analysis", DMKD '03 Proceedings of the 8th ACM SIGMOD workshop on Research issues in data mining and knowledge discovery, pp. 42-48, San Diego, California, Jun. 2003, ACM.

Lee, et al., "Inferring Expertise in Knowledge and Prediction Ranking Tasks", Topics in Cognitive Science 4, pp. 151-163, 2012, Cognitive Science Society, Inc.

Lin, et al., "SmallBlue: Social Network Analysis for Expertise Search and Collective Intelligence", IEEE International Conference on Data Engineering, pp. 1483-1486, 2009, IEEE.

* cited by examiner

DYNAMICALLY INFERRED EXPERTISE

TECHNICAL FIELD

The present disclosure relates generally to computer networks, and, more particularly, to dynamically inferring expertise of an individual (e.g., using machine learning).

BACKGROUND

Customers are accustomed to contacting a company (e.g., help line) for technical assistance. Often, a customer's case can takes several hops before landing in an appropriate engineer's queue who is the expert in the technology area related to the case. The usual method of finding expertise is based on résumés or profiles defined by individuals using traditional structured database filters. Hence case routing algorithms typically fail as they are based on static expertise profiles defined in the system, thus leading to longer case resolution time.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computing device scans a plurality of available data sources associated with a profiled identity for an individual, and categorizes instances of the data sources according to recognized terms within the data sources. Once determining whether the profiled identity contributed positively to each categorized instance, categorized instances that have a positive contribution by the profiled identity may be clustered into clusters. The computing device may then rank the clusters based on size of the clusters and frequency of recognized terms within the clusters, and can then infer an expertise of the profiled identity based on one or more best-ranked clusters. The inferred expertise of the profiled identity may then be stored (e.g., for use by selection algorithms, skillset analysis, etc.).

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
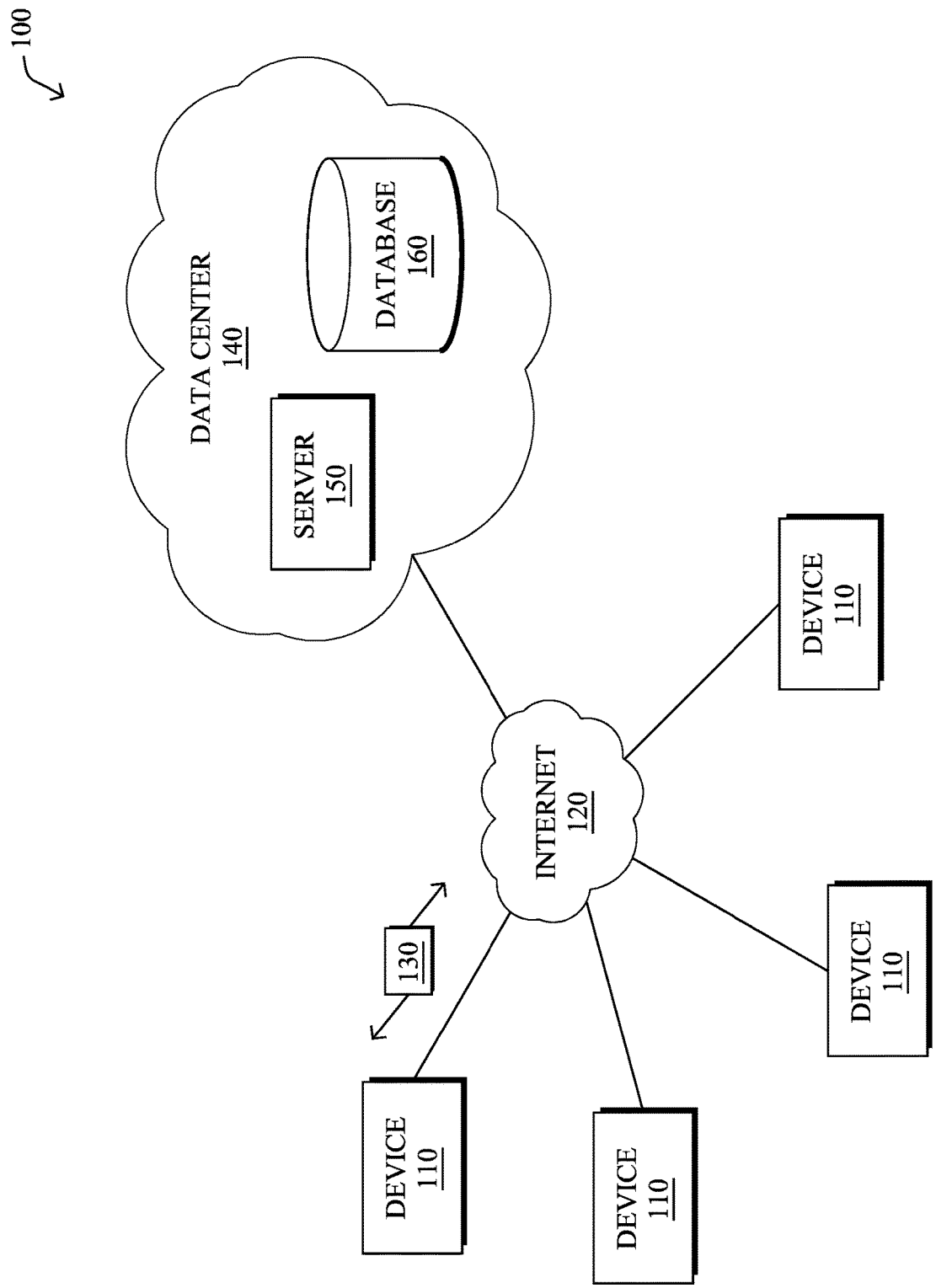
FIG. 1 illustrates an example communication network.

FIG. 1 is a schematic block diagram of an example computer network 100 is illustratively comprising nodes/devices, such as a plurality of devices interconnected by links or networks, as shown. For example, one or more user devices 110 (e.g., computers, laptops, tablets, smartphones, etc.) may be interconnected via a network 120 (e.g., the Internet) through various networking mechanisms (e.g., local networks, cloud networks, private networks, and so on). For instance, certain devices may be located in (or otherwise associated with) a call or service center, while other devices may be based in a home or office network.

Data packets 130 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Data packets 130, in particular, may be configured to carry information relating to various data sources, as described below (e.g., emails, web pages, chat room messages, documents, etc.)

One or more data centers 140 may comprise various computing resources, such as servers 150, databases 160, and so on. Notably, networks and data center/cloud environments may be located in different geographic locations, and may be spread across those locations. For instance, servers 150 may include, in various embodiments, any number of suitable servers or other cloud-based resources. As would be appreciated, network 100 may include any number of local networks, data centers, cloud environments, devices/nodes, servers, etc., and the view shown herein is merely an example that is not meant to be limiting to the embodiments herein.

Figure 2:
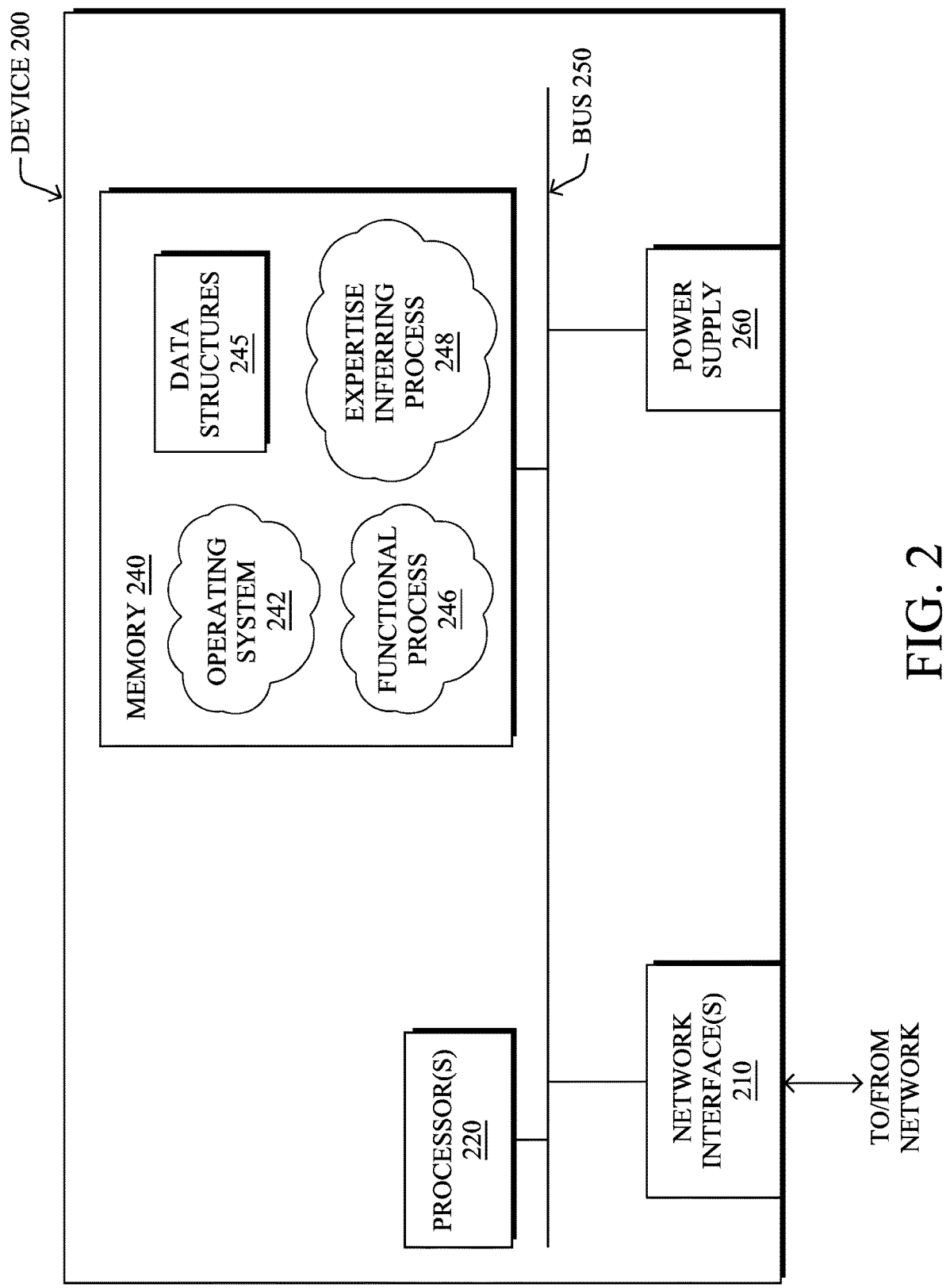
FIG. 2 illustrates an example network device/node.

FIG. 2 is a schematic block diagram of an example computing device 200 that may be used with one or more embodiments described herein e.g., as any of the devices shown in FIG. 1 above, and particularly as specific devices as described further below (e.g., servers, centralized devices, distributed processes, cloud resources, and so on) or any other computing device with access to the operations of network. The device may comprise one or more network interfaces 210 (e.g., wired, wireless, cellular, etc.), at least one processor 220, and a memory 240 interconnected by a system bus 250, as well as a power supply 260 (e.g., battery, plug-in, etc.).

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245 (such as data source database 249, described below). An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "expertise inferring" process 248, as described herein. Notably, functional processes 246, when executed by processor(s) 220, cause each particular device 200 to perform the various functions corresponding to the particular device's purpose and general configuration. For example, a server would be configured to operate as a server, a router would be configured to operate as a router, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments as described below, the illustrative expertise inferring process 248 may utilize machine learning techniques to perform various aspects of the techniques described below. In general, machine learning is concerned with the design and the development of techniques that take as input empirical data (such as network statistics and performance indicators, or natural language processing (NLP) inputs), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

One class of machine learning techniques that is of particular use in the context of the techniques herein is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Dynamically Inferred Expertise

As noted above, customers are accustomed to contacting a company for technical assistance, though a customer's case can often pass through several people before reaching the right person with appropriate expertise. The usual method of finding expertise is insufficient as it is based on static résumés or profiles defined by individuals using traditional structured database filters.

Contrary to the conventional method, the techniques herein can dynamically determine an individual's most current and relevant expertise. For instance, in current environments, data is flowing in all variants of data formats including structured (pre-determined metadata), semi-structured (workflows, state-transitions) and unstructured data (emails, comments, documents, and so on). Inferring expertise of a person from his or her interaction in all of these various forms is challenging, and cannot be done in any existing traditional business analytics or just basic mining approaches.

The techniques herein, therefore, machine learning and natural language processing (NLP) to dynamically infer expertise areas for a given individual/professional. Since most people don't update their résumé often (or completely), the expertise may illustratively be based on intellectual capital (IC) from various diverse sources (e.g., forums, service assistance cases, mailing lists, and so on). That is, a skilled individual typically leaves a digital trace within an expertise domain that has a structure for certain skills (e.g., doctor, lawyer, engineer, etc.). The techniques herein can examine a number of different data inputs, and automatically infer expertise of the individual based on actual contributions of knowledge, feedback on those contributions, their frequency, their influence, their ability resolution of a problem, and so on. The techniques herein may also infer expertise based on tracking the progression of a particular conversation about a topic, such as whether someone answers a question, resolves an issue, or transfers the question to another individual, etc.

In this manner, the techniques here may dynamically determine an individual's skillset variation over time, and may build a skills database spanning a large number of individuals. Note that in certain embodiments described below, the techniques herein may also determine "adjacent" skillsets. (For example, an adjacency may be formed where someone who knows about baking usually knows something about cooking (thus baking may be adjacent to cooking), but someone who knows about baking does not necessarily know anything about oven repair (thus baking and oven repair need not be adjacent).) Thus, an adjacent skills matrix may provide a transition flow (like a state machine) into what technologies (areas of expertise) transition into which other technologies (areas of expertise). That is, by categorizing adjacent skill areas, the techniques herein may suggest areas for re-skilling (and create learning transition plans), and may create a high-level "heatmap" of expertise (e.g., graph relationship between skills), as described herein.

Specifically, according to one or more embodiments of the disclosure as described in detail below, a computing device scans a plurality of available data sources associated with a profiled identity for an individual, and categorizes instances of the data sources according to recognized terms within the data sources. Once determining whether the profiled identity contributed positively to each categorized instance, categorized instances that have a positive contribution by the profiled identity may be clustered into clusters. The computing device may then rank the clusters based on size of the clusters and frequency of recognized terms within the clusters, and can then infer an expertise of the profiled identity based on one or more best-ranked clusters. The inferred expertise of the profiled identity may then be stored (e.g., for use by selection algorithms, skillset analysis, etc.).

Illustratively, the techniques described herein may be performed by hardware, software, and/or firmware, such as in accordance with the "expertise inferring" process 248, which may include computer executable instructions executed by the processor 220 to perform functions relating to the techniques described herein, in conjunction with data source database 249. Generally, the process 248 may be executed on any suitable network device, such as a server (e.g., local, distributed, cloud-based, etc.), or other device with appropriate visibility, connectivity, and authority.

Again, as noted above, technical assistance engineers resolve many customer issues in their day-to-day operation, but there are many times they need help from experts in order to resolve these customer issues. It is not very easy to determine who experts are in a specific area, particularly as those areas may be changing as newer technologies, newer problems, or newer knowledge generally develops over time.

Operationally, therefore, the techniques herein learn or "infer" expertise from the past contributions, such as service cases resolved, articles published, community posts answered, blog posts attempted, etc., using natural language processing (NLP) and machine learning based techniques. Creation of inferred expertise can be used to list experts in a particular technical area or to identify a person with a stack of technologies that are needed to solve a specific problem. Accordingly, the techniques herein may infer an individual's skillset (e.g., technical skills, problem-solving knowledge, and general information) based on his or her interaction with various data sources, such as service requests, bug resolving, community forums, communication with developers, customers and so on.

Figure 3:
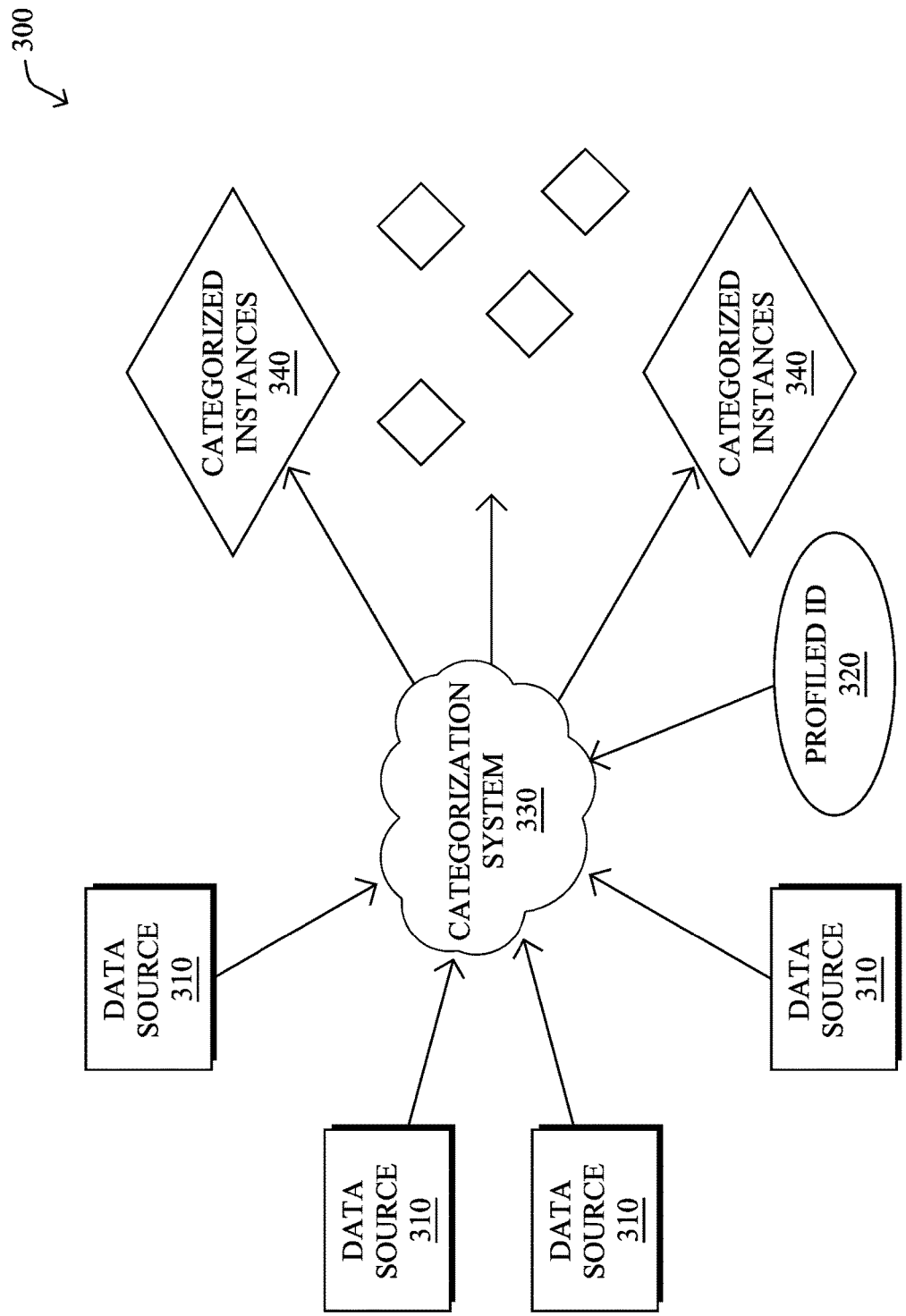
FIG. 3 illustrates an example of clustering categorized instances of data sources.

FIG. 3 illustrates a simplified diagram 300 of various data sources 310 that may be associated with a given individual (e.g., a profiled identity 320 of that individual). As will be understood by those skilled in the art, there is a wide spread of different sources, in variants of formats ranging from structured, to semi-structured, to unstructured data, where an individual can exchange and showcase their skills, which involves human interaction and behaviors skills. Note that profiled identities 320 may be based on any useful online signature, such as, e.g., username, handles, IP addresses, correlated devices, employee number, phone number, and so on. Various techniques may be used to track a user's online profile, and any suitable techniques may be used in accordance with the techniques herein.

The data sources 310 may illustratively be collected and scanned by an illustrative categorization system 330 to output categorizations 340 of instances of the data, which, once accounting for various influencing factors as described herein, result in clusters of potential expertise. As an example, in a first step, the techniques herein may take previously resolved service requests (SRs) (customer cases), and apply may apply Named Entity Recognition and Classification (NERC) techniques and clustering algorithms for automatic categorization of the data. Note that instead of a generic categorization, the techniques here may use industry-specific categorization (e.g., products or technologies offered by the industry, such as router product names and routing protocols, rather than everything from baking to carpentry terms). Seeding the categorization this way may help produce more relevant clusters for the industry, though notably categorization may be adjusted over time, e.g., based on recognizing and/or classifying different terms within the data sources (e.g., new product names, new terms for problems, etc.).

Figure 4:
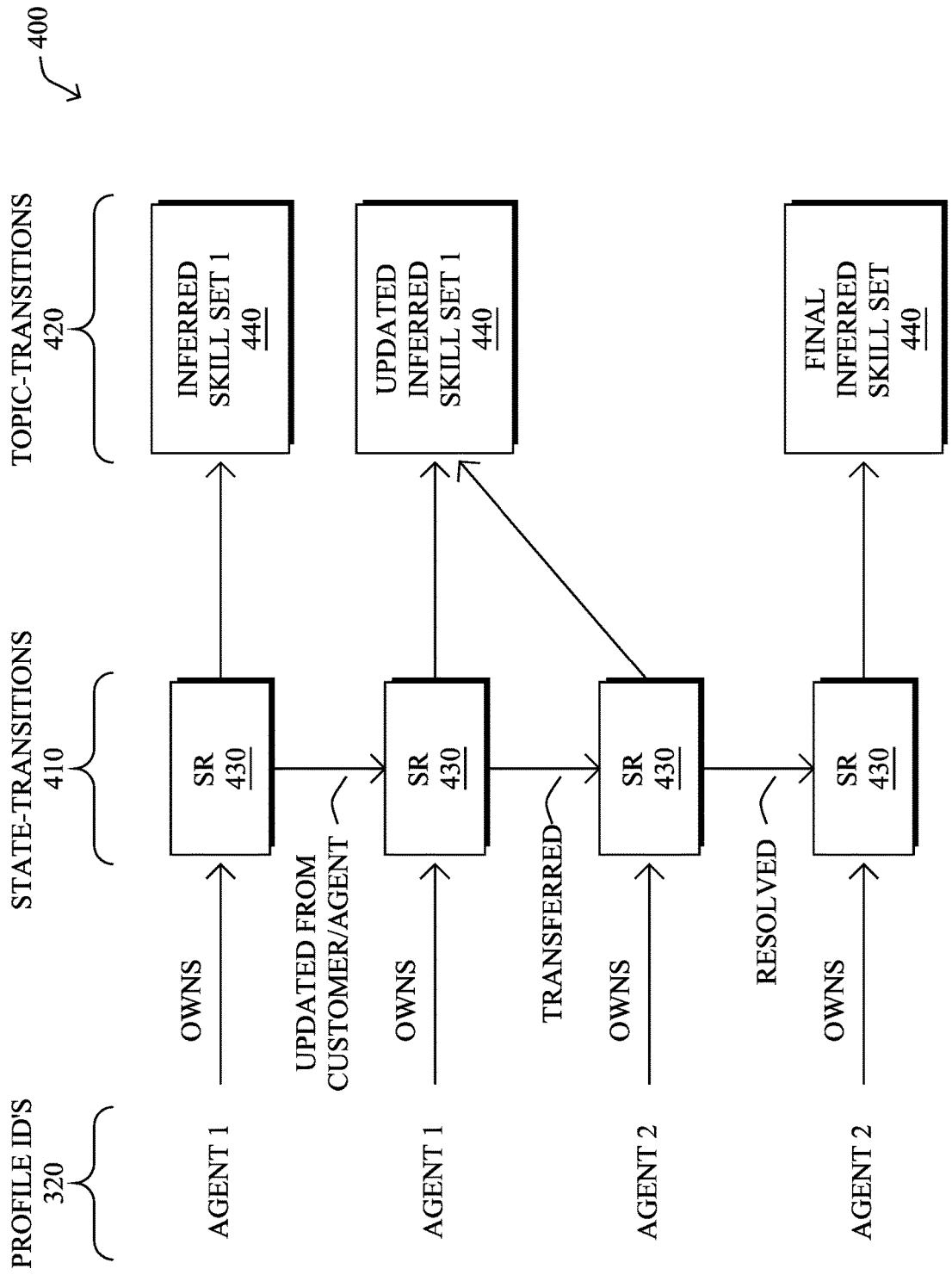
FIG. 4 illustrates an example of a state and topic transition graph.

With reference to FIG. 4, a state and topic transition graph 400 is shown, where the state-transition portion 410 of the graph may be built from an audit log of a service request and a topic-transition portion 420 of the graph may be built from case notes as the case progresses, since the topic often changes to narrow down a problem. That is, in the illustrative example of service requests (SRs) 430, service request records also contain, as profile identities 320, whoever contributed knowledge, debug suggestions, etc. to resolve the case. Also, since the initial subject (e.g., case statement) may change many times over the course of a conversation, such as several transitions when a customer gives more updates or when an agent asks more information or questions. Accordingly, it is important to capture inferred skills at each change through the topic-transition graph 420. Having inferred skills at each state change helps the techniques herein to assign more accurate rankings to an individual's expertise (e.g., and also helps to minimize falsely giving negative rankings).

This information can be used to associate the individuals to the categorization of terms and technologies (e.g., a product catalog) to begin the process of inferred skill sets 440. Through this analysis, the techniques herein may illustratively build a social graph (described below) of the engineers who are involved in the case routing. State transition helps track how a case (or any other conversation) has moved to different states (e.g., resolved, transferred, etc.), and how different individuals helped at each stage to resolve the case. As shown herein, this information helps to rank an individual's skills when a case is resolved, updated, or transferred. (Note that an individual's reputation, or on their public comments (e.g., likes, shares, votes, ranking, rating, etc.) from other systems may be used to weight the rankings.)

All three of these graphs (the state-transition graph, topic-transition graph, and social-graph) may illustratively be used to cluster individual expertise of those who are involved in the life of a conversation (e.g., case). Note that in addition to service requests, this same model may be applied to other sources of data, such as communities, forums, blogs, articles, emails, and so on.

Figure 5:
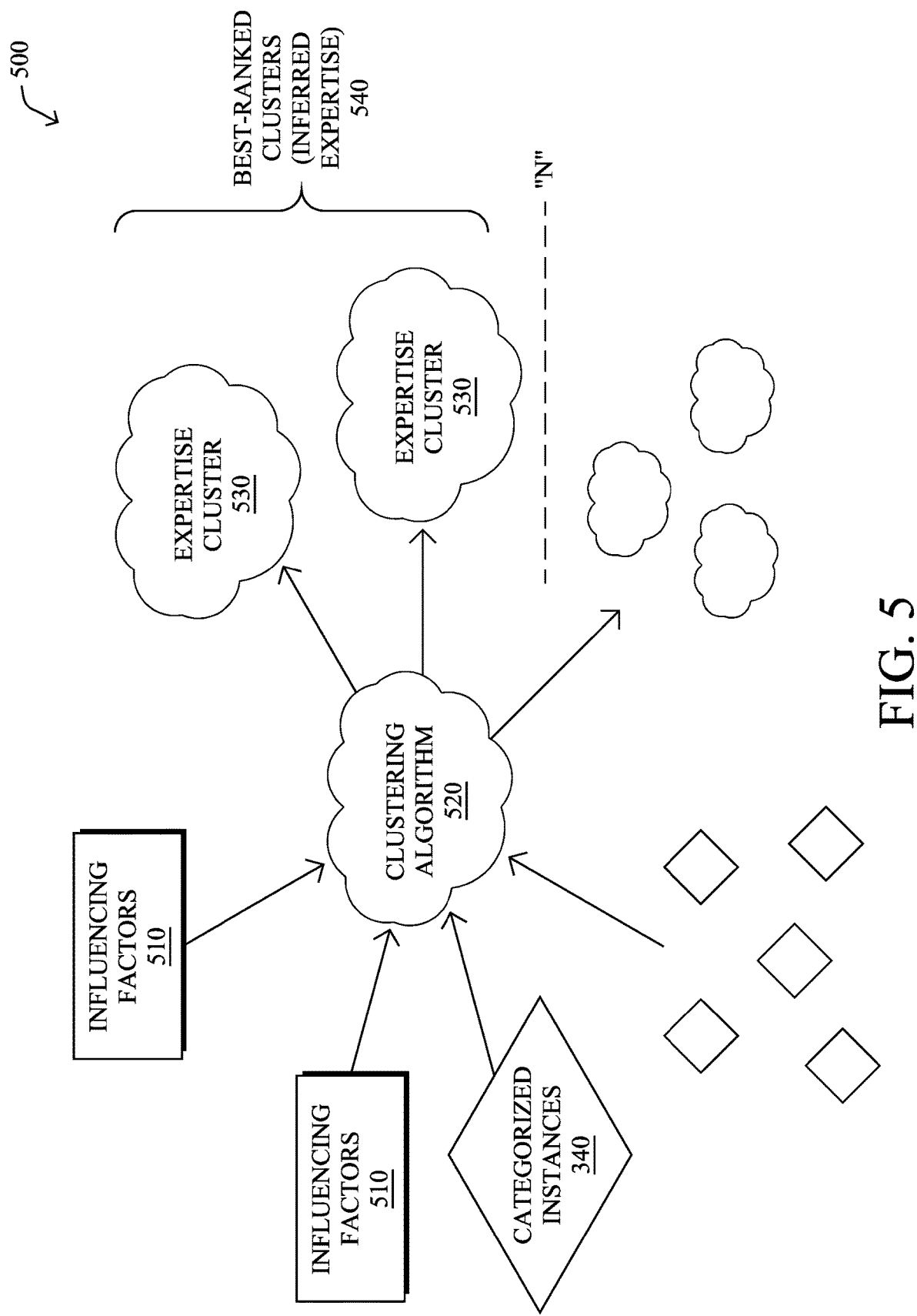
FIG. 5 illustrates an example an example of inferring expertise based on data sources and various influencing factors.

As shown in FIG. 5, that is, these categorized data instances 340 and influencing factors 510 (e.g., the three graphs above, the positive influence rating, reputation weights, and so on) may be used by a clustering algorithm 520 in clustering system 500 in order to output clusters 530 of expertise for the given profile identity (i.e., the individual/ expert). According to the techniques herein, the clusters of expertise may also be ranked, such as based on the size of the clusters and the frequency of terms within the clusters (e.g., how often the term "Router XYZ" appears in given data instances). Inferred expertise of an individual may then be computed by selecting the "N" best (highest) ranking clusters 540. Considering the current variants formats and sources of the inflow of data into the system, the techniques herein thus provides an expertise inferring service based on artificial intelligence (AI)-based cognitive psychology that incorporates machine learning intelligence and behavior analytics models.

Figure 6:
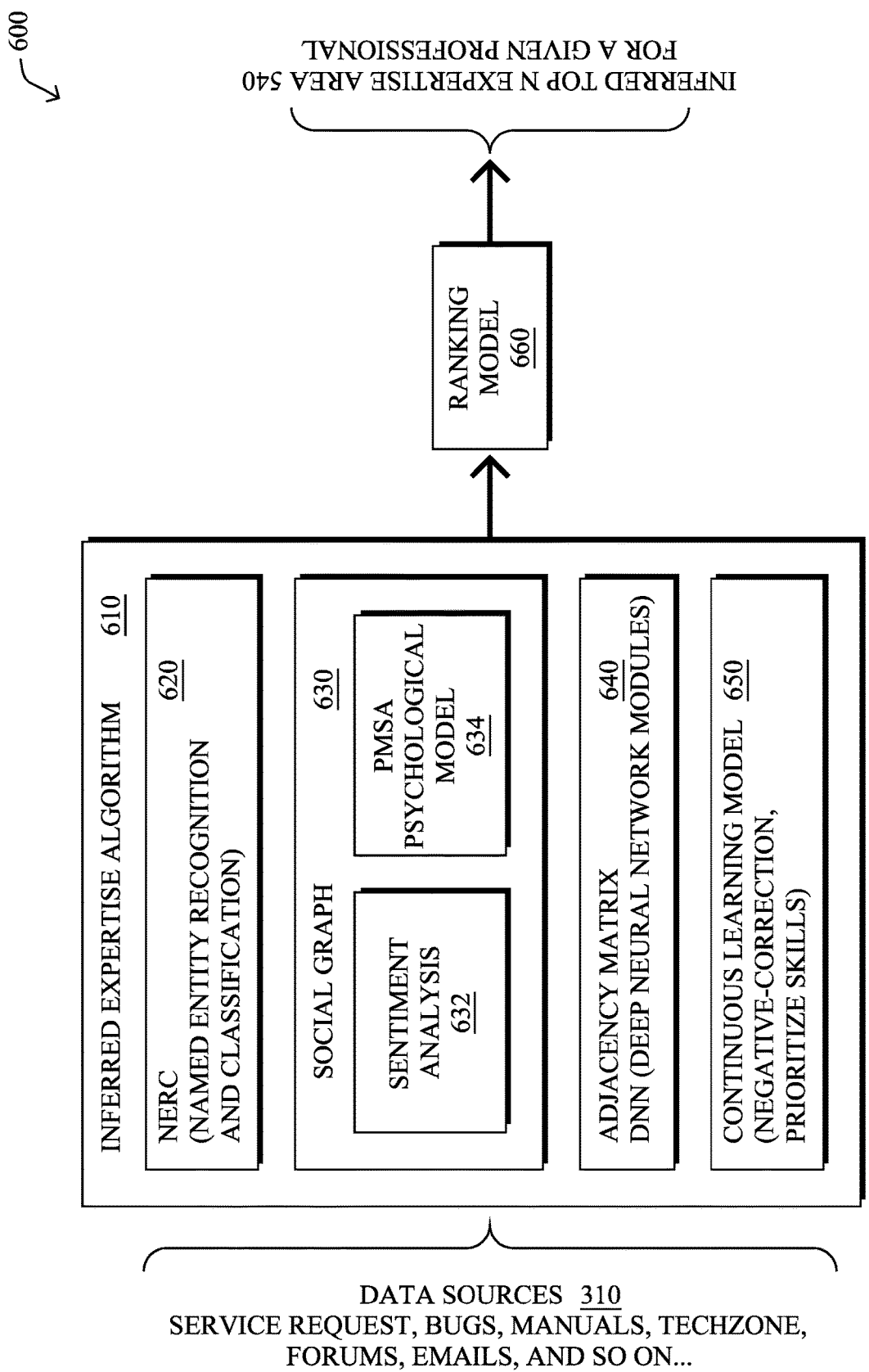
FIG. 6 illustrates a more detailed example of inferring expertise based on data sources and various influencing factors.

FIG. 6 illustrates another, more detailed, example 600 of inferring expertise based on data sources and various influencing factors. In particular, the data sources 310 enter an inferred expertise algorithm 610 (e.g., categorization algorithm 330 and clustering algorithm 520), which may comprise a Named Entity Recognition and Classification (NERC) system 620 and a social graph system 630 (e.g., with associated sentiment analysis 632 and psychological model based sentiment analytics (PMSA) graph 634, described below). As also described below, the inferred expertise algorithm 610 may further comprise an adjacency matrix 640 and continuous learning model 650 (keeping track of the ranking and adjusting as and when new experiences and data sources are logged). Through ranking model 660, the inferred top "N" expertise areas 540 for a given individual/professional may be determined, in accordance with the techniques described herein.

Illustratively, the techniques herein may build a NERC 620 (as will be understood in the art) on vertical sourcing a large scale of text data, e.g., using an unsupervised learning model (e.g., with feature extractions similar to PMI-R (Pointwise Mutual Information-Retrieval)). This may be pipelined with NLP-based algorithms models like which provide contextual-based skill extraction on processing all the data sources owned by a given person. A vectorization matrix created in this phase may be used as a key input to the techniques herein.

The psychological model based sentiment analytics (PMSA) graph 634 is a type of social graph to build out the connection and relationship with peer experts and developers. Based on the graph content, customized ranking algorithms build on the sentimental analytics built on email exchanges and conversation from forums where technical content and support activities are carried out. Furthermore, the sentiment analytics 632 serves to derive several categorical rankings for identifying the key actions of person likely actively solving a case, such as consulting with experts, channelizing, counseling, and so on. Said differently, the psychological models based sentiment analytics is driven by the experienced background, knowledge domain, service request solving topics, and generally any other useful input into the analytics. For instance, the system herein may perform sentiment analyses based on customer inputs/conversations, providing more weightage for the skillset derived from the related data instance (e.g., a customer rated the answer highly, or was satisfied with the result, etc.). The system may also consider the details related to the different language barriers influencing the solving approach/time/ skills needed (e.g., a China/India based engineer solving a London customer problem, and so on).

Figure 7:
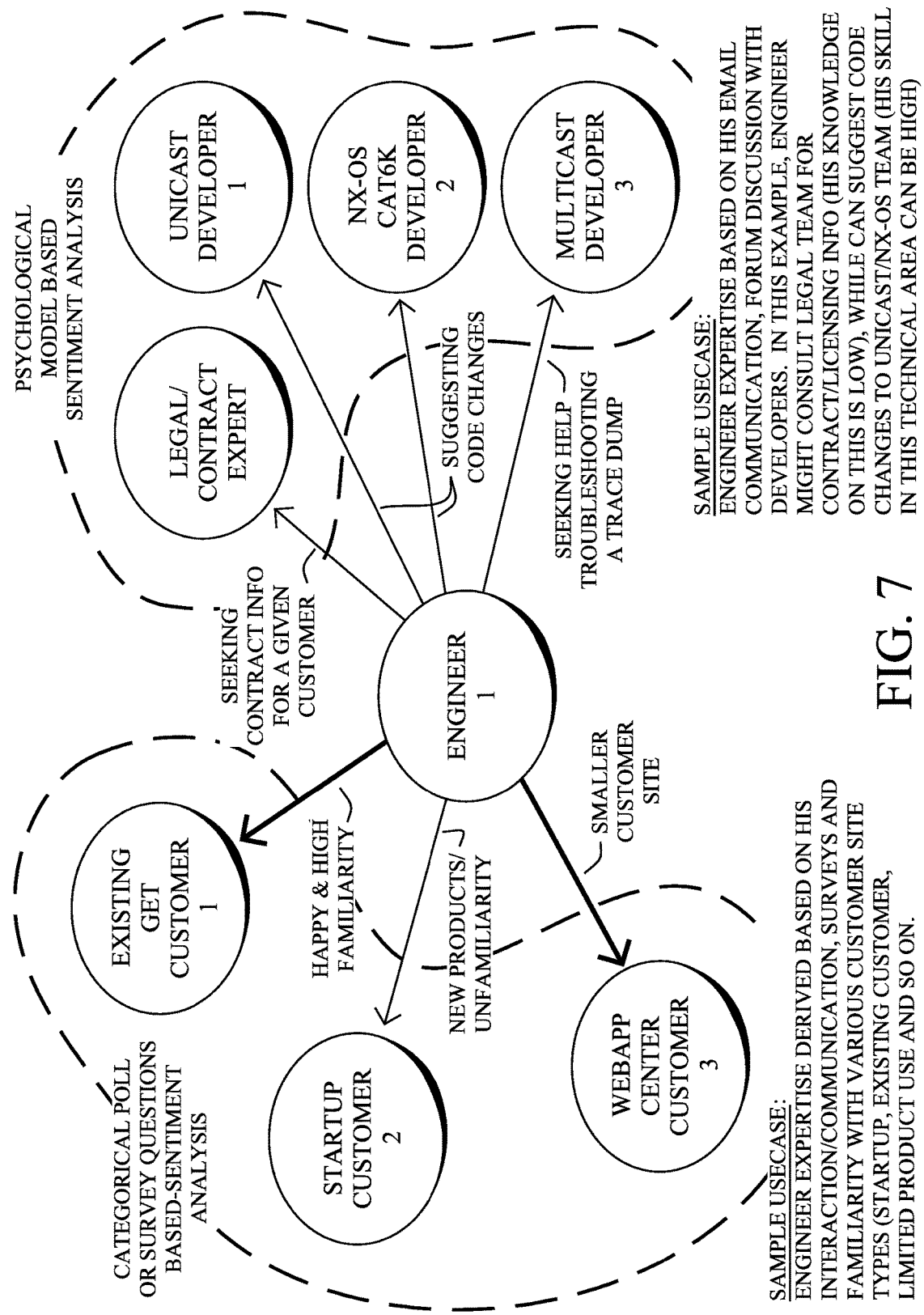
FIG. 7 illustrates an example inferred expertise social graph.

FIG. 7 illustrates an example inferred expertise social graph 700 created in accordance with one or more embodiments herein, with two illustrative data source use cases. For instance, in one use case, assume that an engineer's expertise is derived based on his/her interaction and communication with customers, various surveys, and familiarity with customer site types (e.g., startups, existing customers, limited product use, etc.). For example, the engineer may have happy customers and high familiarity with existing customers (e.g., for "GET" or "group encrypted transport" customers), and as such, may have high expertise with the GET protocol or with the customer itself (e.g., valuable for knowing the systems, architecture, personnel, politics, etc.). Conversely, the engineer might have a lower familiarity with new startup customers, or smaller (e.g., web app center) sites. On the other hand, based on other interactions with this same engineer, another sample use case may be based on email communication and/or forum discussion with internal developers. For example, the engineer might contact a legal team for contract or licensing information (e.g., not as familiar with this topic), but can suggest code changes to unicast portions of a network operating (e.g., "nx-os") team, thus indicating his/her familiarity there (e.g., ranking skills 1-3, and not including legal/contracts as an expertise).

As described above the individual derived expertise skills may be ranked based on insights from all the prior pipelines. That is, the techniques herein take any number of influencing variable factors as input into the advanced machine learning based sentiment analytics graph, and build a ranking system on acquired expertise. Note that as mentioned above, negative-corrections may also be made based on handling and transitions of each data source (e.g., each problem-case before solving). For example, when the original model ranked one of the top five skills of a computer-network engineer as "multicast protocols", but that engineer forwarded a multicast question or required additional resources to resolve a multicast-related issue, the system herein might bring a negative point on that particular skill (reducing its ranking).

Figure 8:
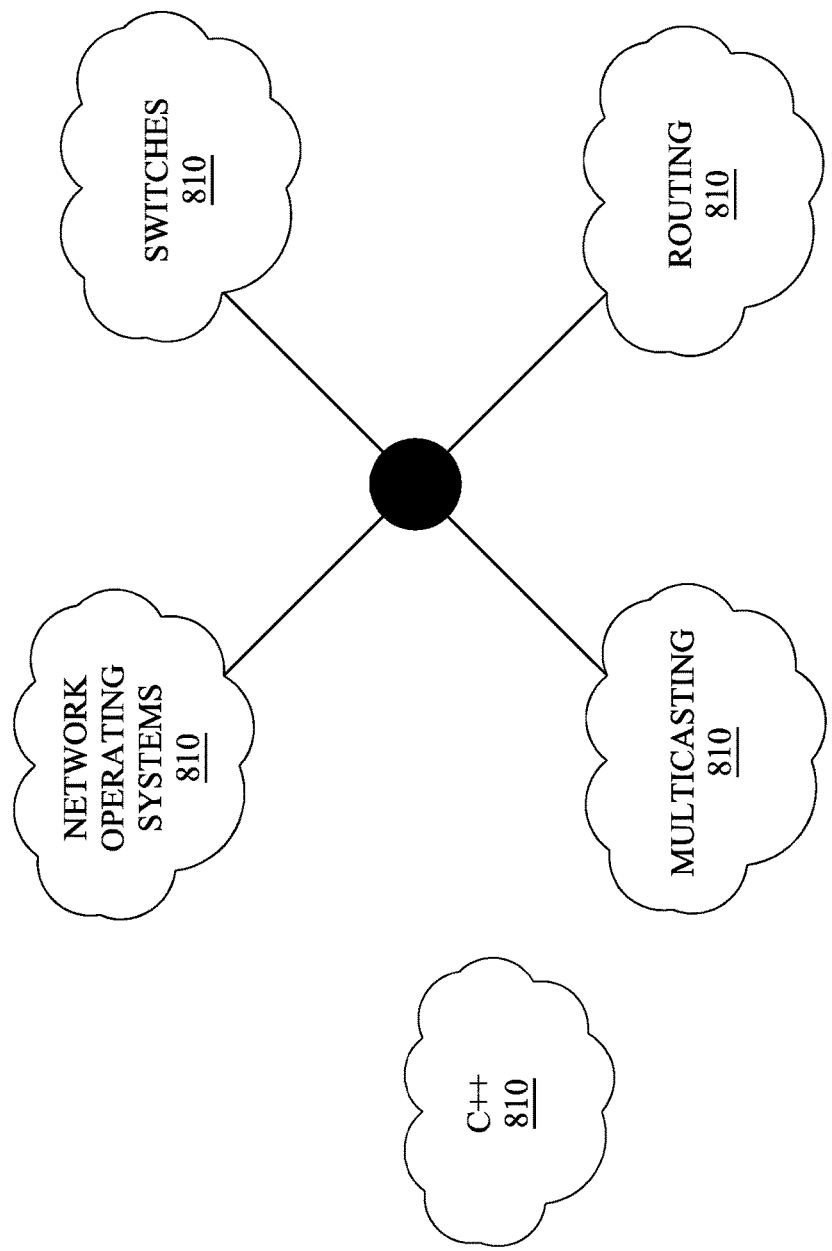
FIG. 8 illustrates an example expertise adjacency matrix.

In accordance with one or more additional embodiments of the techniques herein, an "Adjacency Matrix" may be created from the results above, and used for such things as skill development and learning requirements. For example, FIG. 8 illustrates an example adjacency matrix 800 (e.g., from adjacency matrix process 640 in FIG. 6 above), where the components described above provide inputs for the Adjacency matrix, which is a combination of related skills and/or skilled required to solve a particular problem-area. For example, assume that an individual has skills for C++, Network Operating Systems, Switches, and Routing. However, it may be determined that many service requests require knowledge in Network Operating Systems, Switches, Routing, and Multicasting as well. Accordingly, an adjacency matrix 800 may be used to match components 810 that are related or particularly useful based on an understanding of the data sets examined above. Recommendations for needed additional skill development and learning required to enable a person to solve a majority of similar problems cases may thus also be made by the system herein (e.g., this individual should learn more about multicasting). Note that according to the techniques herein, adjacency matrix 800 is not only based on association (e.g., ontology-based association as well as machine learning base association), but also breaks in associations (i.e., disassociations), such as where knowledge of one product family (e.g., "router X-1") does not necessarily imply knowledge about another product family (e.g., "router X-2"). (Note that the format for adjacency matrix 800 is merely for illustration, and any suitable format may be used, such as tables, graphs, and so on.)

Figure 9:
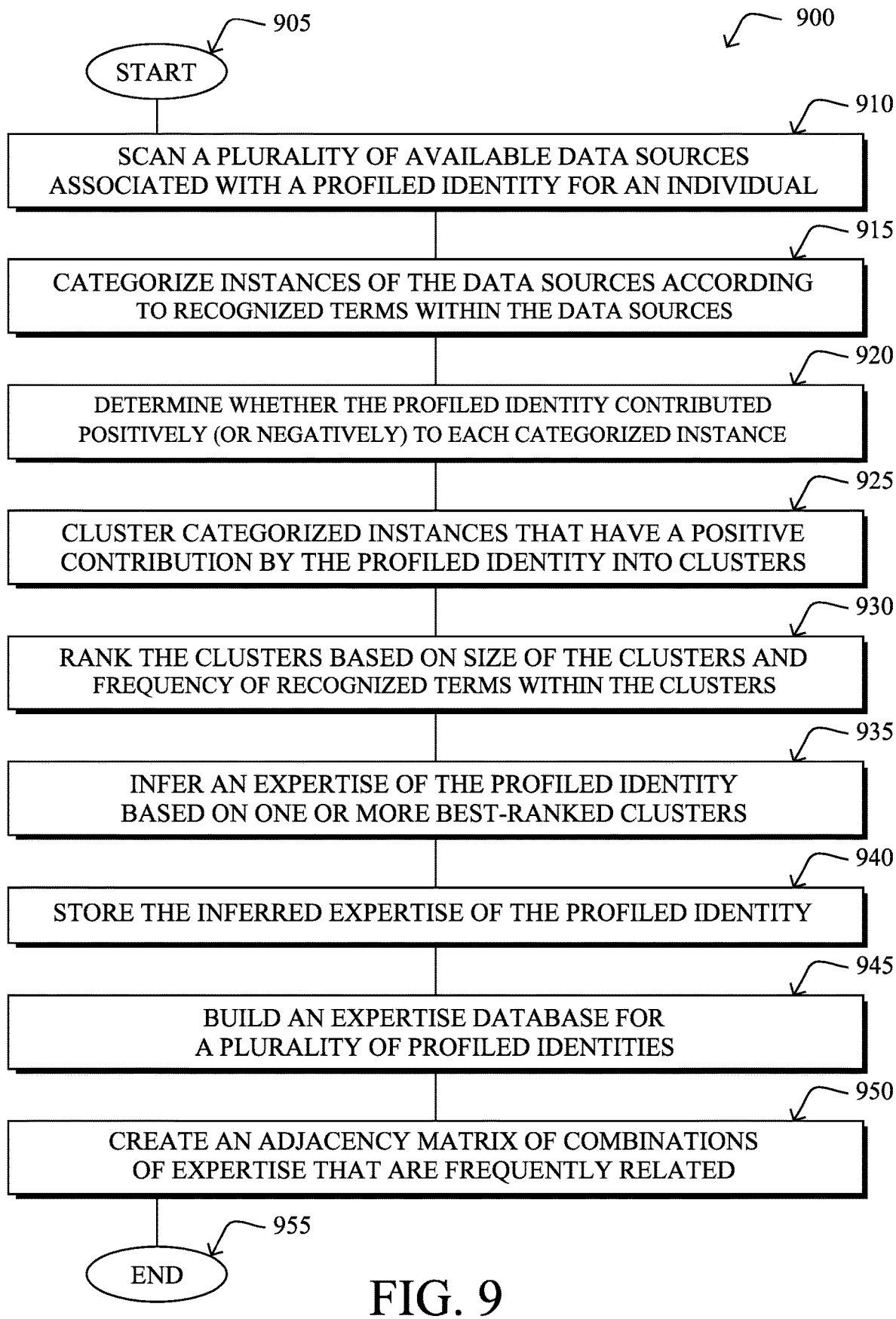
FIG. 9 illustrates an example simplified procedure for dynamically inferring expertise.

FIG. 9 illustrates an example simplified procedure for dynamically inferring expertise in accordance with one or more embodiments described herein. For example, a non-generic, specifically configured device (e.g., device 200) may perform procedure 900 by executing stored instructions (e.g., process 248). The procedure 900 may start at step 905, and continues to step 910, where, as described in greater detail above a computing device 200 (e.g., server) scans a plurality of available data sources 310 associated with a profiled identity 320 for an individual. For instance, as described above, scanning may involve performing text recognition and classification on the plurality of available data sources (e.g., structured data sources, semi-structured data sources, and unstructured data sources), such as service requests, debugging guides, manuals, software coding contributions, forum posts, blogs, articles, whitepapers, research papers, emails, and any other suitable source of data.

In step 915, the device (e.g., categorization system 330) categorizes instances of the data sources according to recognized terms within the data sources, e.g., based on ontology, machine learning discovery, etc. For example, as mentioned above, categorization of instances may be seeded with industry-specific categories, and/or may be adjusted based on recognizing and classifying terms found in the data sources.

In step 920, the computing device may determine whether the profiled identity (the individual) contributed positively (or negatively) to each categorized instance 340, such as by performing sentiment analysis on the categorized instances as detailed above. For example, as described above, a state-transition graph may be created to follow progress of a conversation, while a topic-transition graph may be created to track topic changes during the conversation. Finally, a social graph may be created to track profile identities of individuals contributing to particular topics of the conversation. In this manner, determining whether the profiled identity contributed positively to each categorized instance may be correspondingly based on contributions that positively progress a conversation about a particular topic.

In step 925, the device (e.g., clustering algorithm 520) clusters the categorized instances that have a positive contribution by the profiled identity into clusters 530, and then through various ranking algorithms (e.g., based on size of the clusters and frequency of recognized terms within the clusters), ranks the clusters accordingly in step 930. Note that as mentioned above, any negative contribution may negatively affect ranking of an associated cluster, and weight may be added to the ranking based on a reputation of the profiled identity (the individual).

According to the techniques herein, therefore, the computing device may infer an expertise of the profiled identity in step 935 based on one or more best-ranked clusters 540, and illustratively stores the inferred expertise in step 940, such as through building an expertise database for a plurality of profiled identities in step 945 that is searchable by expertise and identity (e.g., and optionally comparing and ranking experts based on their level of expertise).

Note that in one embodiment, step 950 may also create an adjacency matrix 800 of combinations of expertise that are frequently related, such as for indicating, for the profiled identity (i.e., a particular individual), one or more lacking expertise areas based on the adjacency matrix, for further skillset development.

The illustrative simplified procedure 900 may then end in step 955, though notably with the option of repeating in order to update the interred expertise over time.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for dynamically inferring expertise. In particular, there are many times an individual (e.g., network support engineer) needs help, and wants to talk to someone who is an expert to either understand the problem, or to help find a solution. Advantageously, the techniques herein can point the individual to a set of top experts in the desired topic. As mentioned above, tagging skills manually takes time, and may not be accurate and sometimes it may not be practical. Conversely, tagging skills from ground truth automatically according to the techniques herein will help support engineers (or anyone) to reach the right person. More accurate case routing and resource allocation can then occur, thus resulting in faster case resolution and increased customer satisfaction.

Note that the techniques herein may also provide an automatic creation of a skills and expertise "heatmap", where the aggregate of the inferred expertise levels can be used for resource allocation or re-skill development. Note further that the social graph and ranking may motivate service engineers to compete in improving skills.

While there have been shown and described illustrative embodiments that provide for dynamically inferring expertise, it is to be understood that various other adaptations and modifications may be made within the spirit and scope of the embodiments herein. For example, while certain embodiments are described herein with respect to using certain models for purposes of classification, categorization, clustering, and ranking, the models are not limited as such and other models may be used, in other embodiments. In addition, while the techniques herein have generally been described with relation to an example of network support engineers, other expertise domains may take advantage of the embodiments herein, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
scanning, by a computing device, a plurality of available data sources associated with a profiled identity for an individual;
categorizing, by the computing device, instances of the data sources according to recognized terms within the data sources;
determining, by the computing device, whether the profiled identity contributed positively to each categorized instance of the categorized instances by identifying, based on a sentiment analysis of the categorized instances, that the profiled identity is associated with comments indicative of a positive transition among a plurality of transition states of the categorized instance;
clustering, by the computing device, categorized instances that have a positive contribution by the profiled identity into clusters;
ranking, by the computing device, the clusters based on size of the clusters and frequency of recognized terms within the clusters;
inferring, by the computing device and based on one or more best-ranked clusters, an expertise of the profiled identity and one or more lacking expertise areas of the profiled identity; and
storing, by the computing device, the inferred expertise of the profiled identity and the one or more lacking expertise areas of the profiled identity by creating an adjacency matrix of combinations of expertise that are frequently related according to the clustering, wherein the adjacency matrix is indicative of the one or more lacking expertise areas of the profiled identity.

2. The method as in claim 1, further comprising:
updating the inferred expertise over time.

3. The method as in claim 1, further comprising:
building an expertise database for a plurality of profiled identities, the expertise database searchable by expertise and identity.

4. The method as in claim 1, wherein scanning the plurality of available data sources comprises:
performing text recognition and classification on the plurality of available data sources.

5. The method as in claim 1, further comprising:
determining whether the profiled identity contributed negatively to any categorized instance by identifying that the profiled identity is associated with comments indicative of a negative transition among a plurality of transition states of the categorized instance, wherein any negative contribution negatively affects ranking of an associated cluster.

6. The method as in claim 1, wherein determining whether the profiled identity contributed positively to each categorized instance further comprises:
creating a state-transition graph to follow progress of a conversation;
creating a topic-transition graph to track topic changes during the conversation; and
creating a social graph to track profile identities of individuals contributing to particular topics of the conversation.

7. The method as in claim 1, further comprising:
seeding categorization of instances of the data sources with industry-specific categories.

8. The method as in claim 1, further comprising:
adjusting categorization of instances of the data sources based on recognizing and classifying terms found in the data sources.

9. The method as in claim 1, further comprising:
adding weight to the ranking based on a reputation of the profiled identity.

10. The method as in claim 1, wherein data sources are one or more of structured data sources, semi-structured data sources, and unstructured data sources.

11. The method as in claim 1, wherein data sources are selected from a group consisting of: service requests; debugging guides; manuals; software coding contributions; forum post; blogs; articles; whitepapers; research papers; and emails.

12. A tangible, non-transitory, computer-readable medium storing program instructions that cause a computer to execute a process comprising:
scanning a plurality of available data sources associated with a profiled identity for an individual;
categorizing instances of the data sources according to recognized terms within the data sources;
determining whether the profiled identity contributed positively to each categorized instance of the categorized instances by identifying, based on a sentiment analysis of the categorized instances, that the profiled identity is associated with comments indicative of a positive transition among a plurality of transition states of the categorized instance;
clustering categorized instances that have a positive contribution by the profiled identity into clusters;
ranking the clusters based on size of the clusters and frequency of recognized terms within the clusters;
inferring, based on one or more best-ranked clusters, an expertise of the profiled identity and one or more lacking expertise areas of the profiled identity; and
storing the inferred expertise of the profiled identity and the one or more lacking expertise areas of the profiled identity by creating an adjacency matrix of combinations of expertise that are frequently related according to the clustering, wherein the adjacency matrix is indicative of the one or more lacking expertise areas of the profiled identity.

13. The computer-readable medium as in claim 12, wherein the process further comprises:
updating the inferred expertise over time.

14. The computer-readable medium as in claim 12, wherein the process further comprises:
building an expertise database for a plurality of profiled identities, the expertise database searchable by expertise and identity.

15. An apparatus, comprising:
one or more network interfaces configured to communicate in a computer network;
a processor coupled to the network interfaces and adapted to execute one or more processes; and
a memory configured to store a process executable by the processor, the process when executed operable to:
scan a plurality of available data sources associated with a profiled identity for an individual;
categorize instances of the data sources according to recognized terms within the data sources;
determine whether the profiled identity contributed positively to each categorized instance of the categorized instances by identifying, based on a sentiment analysis of the categorized instances, that the profiled identity is associated with comments indicative of a positive transition among a plurality of transition states of the categorized instance;

cluster categorized instances that have a positive contribution by the profiled identity into clusters;

rank the clusters based on size of the clusters and frequency of recognized terms within the clusters;

infer, based on one or more best-ranked clusters, an expertise of the profiled identity and one or more lacking expertise areas of the profiled identity; and store the inferred expertise of the profiled identity and the one or more lacking expertise areas of the profiled identity by creating an adjacency matrix of combinations of expertise that are frequently related according to the clustering, wherein the adjacency matrix is indicative of the one or more lacking expertise areas of the profiled identity.

16. The apparatus as in claim 15, wherein the process when executed is further operable to:

update the inferred expertise over time.

17. The apparatus as in claim 15, wherein the process when executed is further operable to:

build an expertise database for a plurality of profiled identities, the expertise database searchable by expertise and identity.

* * * * *

UNITED STATES PATENT AND TRADEMARK OFFICE
CERTIFICATE OF CORRECTION

PATENT NO. : 11,170,319 B2  
APPLICATION NO. : 15/581719  
DATED : November 9, 2021  
INVENTOR(S) : Sujit Biswas et al.

Page 1 of 1

It is certified that error appears in the above-identified patent and that said Letters Patent is hereby corrected as shown below:

In the Specification

Column 2, Line 33, please amend as shown:  
computer network 100 illustratively comprising nodes/

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*